Patented Apr. 11, 1950

2,503,292

UNITED STATES PATENT OFFICE 2,503,292

SYNTHESIS OF FLUORANTHENE AND ITS DERIVATIVES

Milton Orchin and Leslie Reggel, Pittsburgh, Pa., assignors to the United States of America as represented by the Secretary of the Interior No Drawing. Application April 10, 1947, Serial No. 740,706

11 Claims. (Cl. 260—670)

(Granted under the act of March 3, 1883, as amended April 30, 1928; 370 O. G. 757)

The invention herein described and claimed may be manufactured and used by or for the Government of the United States of America for governmental purposes without the payment of any royalties thereon or therefor.

It is an object of this invention to produce fluoranthene and its derivatives by cyclodehydrogenation of phenylnaphthalene or derivatives thereof. It is a further object to produce fluoranthene or substituted fluoranthenes by a single, direct step from phenyl naphthalene, partially hydrogenated phenyl naphthalene and ring substituted derivatives of phenylnaphthalene, which are readily available starting materials. Other and further objects will be readily apparent or will appear hereinafter.

Fluoranthene is of importance in the dye industry where it is used for the preparation of certain intermediates. Heretofore, it has been obtained from coal tar, where it occurs in appreciable quantities, but its isolation in the necessary purity is rather difficult and tedious. The resulting expense, reflected in the cost of the material, has severely limited the extent and variety of industrial applications of the material. Existing markets would be greatly expanded as well as new commercial uses encouraged by the production of fluoroanthene of the desired purity at a lowered cost by synthesis from readily available starting materials.

A method for the synthetic production of fluoranthene was first described by J. von Braun and E. Anton (Ber. vol. 62, p. 145 (1929)). While this method definitely established the structure of fluoranthene as

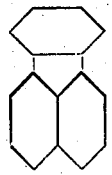

and that the previously accepted structure was incorrect, it is a five step process starting with ethyl 9 - sodium - 9 - fluorenecarboxylate. Since this starting material itself is expensive and difficult to prepare, the Braun and Anton method is not attractive commercially.

Insignificant yields of fluoranthene are obtained according to the synthesis described by Cook and Lawrence (J. Chem. Soc. 1431 (1936)). This is a three step process starting with α-naphthyl magnesium bromide and methyl cyclohexanone, the product being successively treated with aluminum chloride and selenium.

Such methods, however, are quite different from that disclosed herein. By our invention fluoranthene and its derivatives can be readily synthesized in a high state of purity from simpler compounds, phenyl naphthalene, partially hydrogenated phenyl naphthalene and ring substituted derivatives of phenyl naphthalene, which may be procured in large quantities at comparatively low cost. This process involves the catalytic cyclodehydrogenation of the phenylnaphthalene starting material in the vapor phase with ring closure, condensing the vapors of the resulting product and thereafter recovering the fluoranthene or ring substituted fluoranthene. In our process hydrogen is removed, effecting a carbon to carbon linkage between adjacent rings forming a new ring of five carbon atoms. This reaction may be diagrammatically represented in the following manner:

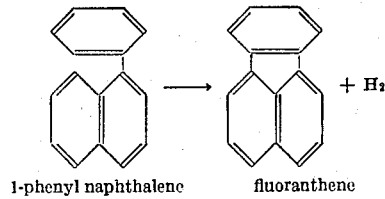

1-phenyl naphthalene      fluoranthene

The present process does not require large quantities of expensive and sensitive catalysts or complicated and expensive apparatus and is characterized by a high percentage yield per pass, which may be made nearly quantitative by recycling unconverted material with a relatively small loss due to decomposition or other undesired side reactions.

We have found that dehydrogenating catalysts such as palladium-charcoal and chrome-alumina are satisfactory for effecting dehydrogenation and ring closure. Other catalysts commonly used in the dehydrogenation of organic compounds may also be employed in this process, including Raney nickel, nickel on kieselguhr and the like. The preparation of a suitable form of palladium-charcoal catalyst for this cyclodehydrogenation is described in Patent 2,414,118 by M. Orchin, one of the applicants herein. The preparation of the catalyst, however, forms no part of our present invention.

Temperatures in the range 420°–525° C. have been found satisfactory for the conversion of phenylnaphthalene and its substitution products. Generally, the temperature chosen will be between the boiling point of the starting material and the temperature at which the rate of decomposition or cracking adversely affects the yield and purity of the desired product.

Depending upon the type of apparatus employed, the reaction of the starting material and other factors, the reaction may be carried out at superatmospheric as well as subatmospheric pressures. We prefer, however, to pass the vaporized phenylnaphthalene compound through the reaction zone at ordinary pressure while mixed with a current of inert gas, such as nitrogen, argon or helium, or one that is inert during the reaction as for example, hydrogen.

A form of apparatus which may be employed for this conversion on a small scale is also described in the said Patent 2,414,118. When the compound to be treated is a solid, a modified form of apparatus, such as that described in a paper by one of the inventors herein, published in the Analytical Edition of Industrial and Engineering Chemistry, vol. 17 at page 673, may advantageously be employed.

Suitable starting materials for the production of fluoranthene according to our invention include 1-phenylnaphthalene, partially hydrogenated derivatives thereof such as 1-(3',4',5',6'-tetrahydrophenyl)-naphthalene, and substituted phenylnaphthalenes, such as 1-(o-tolyl)-3,4-dihydronaphthalene.

The form and arrangement of the catalyst are subject to a wide range of modifications and will be determined in part at least, by the type of catalyst and the design of the reaction apparatus. For most installations the catalyst is preferably supported on an inert carrier, which may be irregular granules or in the form of pellets, spheres, discs or other geometrical shapes which will provide the desired area of contact without excessive pressure drop in the catalyst bed. In other installations, however, the catalyst may be used without a carrier and maintained in the reaction zone by mechanical means such as trays and the like.

The following examples will further and more specifically illustrate the nature of our invention and how the same may be carried out in practice, but it should be understood that the invention is not limited to said examples.

*Example I*

1 - (3',4',5',6' - tetrahydrophenyl) - naphthalene prepared from 1-naphthyl magnesium bromide and cyclohexanone by the method of Weiss and Woidich (Monats 46, 453) and Sherwood, Short and Stanfield (J. Chem. Soc. 1832 (1932)) was passed in vapor phase in a current of hydrogen through an electrically heated reaction zone maintained at from 420°–430° C. The reaction zone was packed with palladium-charcoal catalyst supported on asbestos, thirty parts of the catalyst being used for each seventy parts of the carrier. This catalyst was prepared according to the directions given in the aforesaid Patent 2,414,118. The vapors are condensed in a cooling zone. In a single pass treatment at atmospheric pressure 258 parts of product were obtained from 280 parts of 1-(3',4',5',6'-tetrahydrophenyl)-naphthalene.

The product was worked up in picric acid dissolved in ethanol, from which 68 parts of fluoranthene picrate (M. P. 184.5–187.5° C.) were obtained, the balance being essentially 1-phenylnaphthalene. The fluoranthene picrate corresponded to a yield of about 11% fluoranthene.

As described below under Example III, the 1-phenylnaphthalene in the product may also be converted to fluoranthene, so that by increasing time of contact or by recycle operation substantially quantitative conversion of 1-(3',4',5',6'-tetrahydrophenyl)-naphthalene to fluoranthene may be effected.

The fluoranthene picrate obtained above is treated in known manner for the recovery of fluoranthene in substantially pure form.

Other methods, of course, may be employed to separate fluoranthene from the other conversion products.

*Example II*

Another sample of 1-(3',4',5',6'-tetrahydrophenyl)-naphthalene was passed through an electrically heated reaction zone similar to that used in Example I, except that it was packed with commercial chromia-alumina pelleted catalyst and the temperature was maintained within the range of 475°–525° C.

In this operation, using 492 parts of the 1 - (3',4',5',6' - tetrahydrophenyl) - naphthalene 147 parts of fluoranthene (M. P. 110–111.5° C.) were obtained, the balance of the product being principally 1-phenylnaphthalene. This was a yield of about 31% fluoranthene on a single pass operation.

*Example III*

1-phenylnaphthalene ($N_D^{20}$ 1.6646) was passed through a boro-silicate (Pyrex) glass tube approximately 14 millimeters outside diameter having a heated reaction zone approximately 70 centimeters in length packed with palladium-charcoal catalyst prepared as in Example I and supported on asbestos. The reaction zone was maintained at a temperature of 450–455° C. and over a period of approximately 3¼ hours 5.01 grams of 1-phenylnaphthalene were passed therethrough 4.43 grams of product were obtained from which 0.32 gram of fluoranthene was isolated. The balance of the product was unconverted 1-phenylnaphthalene.

*Example IV*

In an extension of the cyclodehydrogenation reaction to produce derivatives of fluoranthene from ring-substituted phenylnaphthalenes, 1-(o-tolyl)-3,4-dihydronaphthalene was employed as the starting material. This compound was synthesized from a Grignard reagent prepared from 68.8 grams of o-bromotoluene, 10.8 grams of magnesium and 250 cubic centimeters of ether, to which reagent was added 47.4 grams α-tetralone in 100 cubic centimeters of ether. After refluxing the solution for 16 hours, ammonium chloride solution was added. From the organic layer, after drying and distillation, 49.6 grams of product, (b2-4 100°–171° C.) was obtained. After refluxing this material with 200 cubic centimeters of 90% formic acid for 3 hours, the hydrocarbon layer was separated and fractionally distilled. 24.2 grams of an oily material (b3-4 147°–151° C., $n_D^{20}$ 1.6198) was obtained. This product analyzed correctly for the compound 1-(o-tolyl)-3,4-dihydronaphthalene.

4.90 grams of this product was passed over palladium-charcoal catalyst as in Example III over a period of two hours and at a temperature of 450°–455° C. Chromatographic separation of the material in the condensate receiver, that is, selective adsorption on activated alumina and absorbent diatomaceous earth following the procedure described in aforesaid Patent 2,414,118, yielded 0.14 gram of a material having the structure of methyl fluoranthene as indicated by ultraviolet absorption spectrum determination, according to the reaction

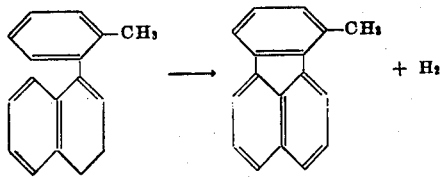

According to the provisions of the patent statutes, we have set forth the principles and mode of operation of our invention and have illustrated and described what we believe to represent its best embodiment. We desire to have it understood, however, that within the scope of the appended claims the invention may be practiced otherwise than as specifically illustrated and described.

We claim:

1. A process for the preparation of fluoranthene which comprises passing a compound selected from the class consisting of 1-phenylnaphthalene and partially hydrogenated derivatives of 1-phenylnaphthalene in the vapor phase over a dehydrogenating catalyst maintained at a temperature within the range of substantially 420°–525° C.

2. A process for the preparation of ring-substituted fluoranthene compounds which comprises passing a ring-substituted phenylnaphthalene compound in the vapor phase over a dehydrogenating catalyst maintained at a temperature within the range of substantially 420°–525° C.

3. A process according to claim 1 in which the dehydrogenating catalyst is palladium-charcoal.

4. A process according to claim 1 in which the dehydrogenating catalyst is chromia on alumina.

5. A process for the preparation of fluoranthene which comprises passing 1-(3',4',5',6'-tetrahydrophenyl)-naphthalene in the vapor phase through a bed of palladium-charcoal catalyst maintained at a temperature in the range 420°–525° C. at a rate to effect substantially complete conversion of the tetrahydrophenyl-naphthalene to fluoranthene and 1-phenylnaphthalene, condensing the resulting products extracting the fluoranthene with picric acid dissolved in alcohol, crystallizing the fluoranthene picrate thereby formed and treating the fluoranthene picrate for the recovery of fluoranthene in substantially pure form.

6. A process for the preparation of fluoranthene which comprises passing 1-(3',4',5',6'-tetrahydrophenyl)-naphthalene in vapor phase through a bed of chromia on alumina maintained at a temperature within the range of substantially 420°–525° C. at a rate to effect substantial conversion thereof to fluoranthene and 1-phenylnaphthalene, condensing the resulting products, extracting fluoranthene from the resulting products and recovering the thus extracted fluoranthene in substantially pure form.

7. A process for the preparation of methyl fluoranthene which comprises passing 1-(o-tolyl)-3,4-dihydronaphthalene in the vapor phase through a bed of palladium-charcoal maintained at a temperature within the range of substantially 420°–525° C., condensing the resulting products and recovering methyl fluoranthene therefrom.

8. A process for the preparation of fluoranthene and ring substituted fluoranthene the steps of passing a compound selected from the class consisting of phenyl naphthalene, a partially hydrogenated derivative of phenyl naphthalene and a ring substituted phenyl naphthalene in the vapor phase in contact with a dehydrogenating catalyst maintained at a temperature above the boiling point of the starting compound but below its decomposition temperature, condensing the resulting products and recovering the fluoranthene type compound therefrom.

9. A process for the preparation of fluoranthene and ring substituted fluoranthene the steps of vaporizing a compound selected from the class consisting of phenyl naphthalene, a partially hydrogenated derivative of phenyl naphthalene and a ring substituted phenyl naphthalene, passing the vaporized compound admixed with an inert gas in contact with a dehydrogenating catalyst maintained at a temperature above the boiling point of the starting compound but below its decomposition temperature, condensing the resulting compounds and recovering the fluoranthene type compound therefrom.

10. A process for the preparation of fluoranthene and ring substituted fluoranthene the steps of passing a compound selected from the class consisting of phenyl naphthalene, a partially hydrogenated derivative of phenyl naphthalene and a ring substituted phenyl naphthalene and in the vapor phase in contact with a dehydrogenating catalyst maintained at a temperature within the range of substantially 420–525° C., condensing the resulting products and recovering the fluoranthene type compound therefrom.

11. A process for the preparation of fluoranthene and ring substituted fluoranthene the steps of vaporizing a compound selected from the class consisting of phenyl naphthalene, a partially hydrogenated derivative of phenyl naphthalene and a ring substituted phenyl naphthalene, passing the vaporized compound admixed with an inert gas in contact with dehydrogenating catalyst maintained at a temperature within the range of 420–525° C., condensing the resulting products and recovering the fluoranthene type compound therefrom.

MILTON ORCHIN.
LESLIE REGGEL.

REFERENCES CITED

The following references are of record in the file of this patent:

UNITED STATES PATENTS

| Number | Name | Date |
|---|---|---|
| 1,964,376 | Wulff | June 26, 1934 |
| 1,977,768 | Kuhrmann | Oct. 23, 1934 |

OTHER REFERENCES

Cook et al.—J. C. S. (1936) 1431–1434.